United States Patent [19]
Ely et al.

[11] Patent Number: 5,449,133
[45] Date of Patent: Sep. 12, 1995

[54] PNEUMATIC DE-ICER HAVING IMPROVED AERODYNAMIC CHARACTERISTICS

[75] Inventors: Duain N. Ely, Uniontown; Joseph H. Macarchenia, Tallmadge, both of Ohio

[73] Assignee: The B.F. Goodrich Company, Akron, Ohio

[21] Appl. No.: 100,520

[22] Filed: Jul. 30, 1993

[51] Int. Cl.$^6$ ............................................. B64D 15/16
[52] U.S. Cl. ................................................ 244/134 A
[58] Field of Search ........................................ 244/134

[56] References Cited

U.S. PATENT DOCUMENTS

| | | | |
|---|---|---|---|
| 2,436,889 | 3/1948 | Hester | 244/134 A |
| 2,957,662 | 10/1960 | Hess | 244/134 |
| 3,370,814 | 2/1968 | Kageorge | 244/134 |
| 3,604,666 | 9/1971 | Achberger | 244/134 |
| 4,516,745 | 5/1985 | Ely et al. | 244/134 |
| 4,561,613 | 12/1985 | Weisend, Jr. | 244/134 |
| 4,779,823 | 10/1988 | Ely et al. | 244/134 |
| 5,074,497 | 12/1991 | Phillips, II | 244/134 A |

*Primary Examiner*—Galen L. Barefoot
*Attorney, Agent, or Firm*—Kevin L. Leffel

[57] ABSTRACT

A de-icer for attachment to an airfoil subject to impingement by an airstream. The airstream induces a stagnation line near the leading edge of the airfoil. The de-icer has inflatable passages that are parallel to the airstream overlying the airfoil on one side of the stagnation line, and inflatable passages that are parallel to the leading edge overlying the airfoil on the other side of the stagnation line. The de-icer maintains the aerodynamic characteristics of the airfoil during de-icer inflation. A method of manufacturing the de-icer is also provided.

21 Claims, 6 Drawing Sheets

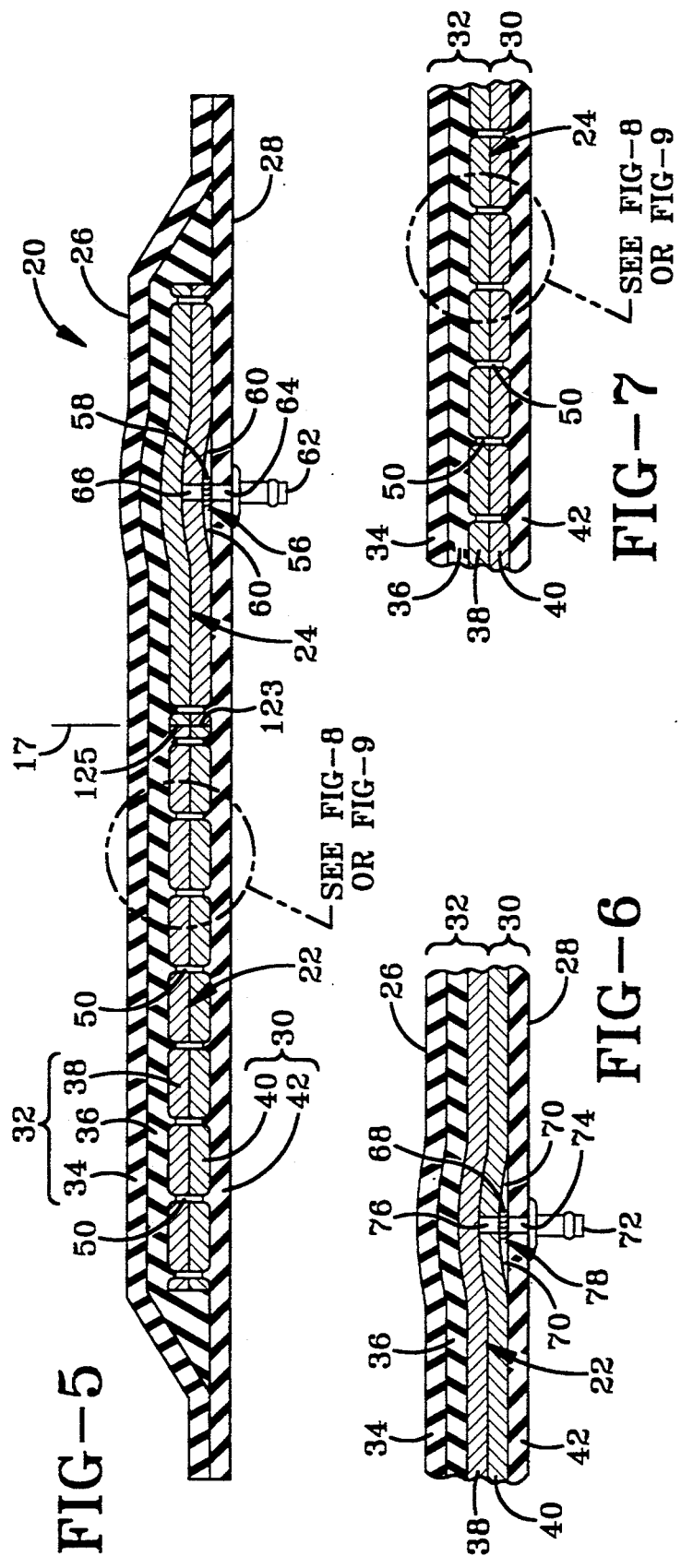
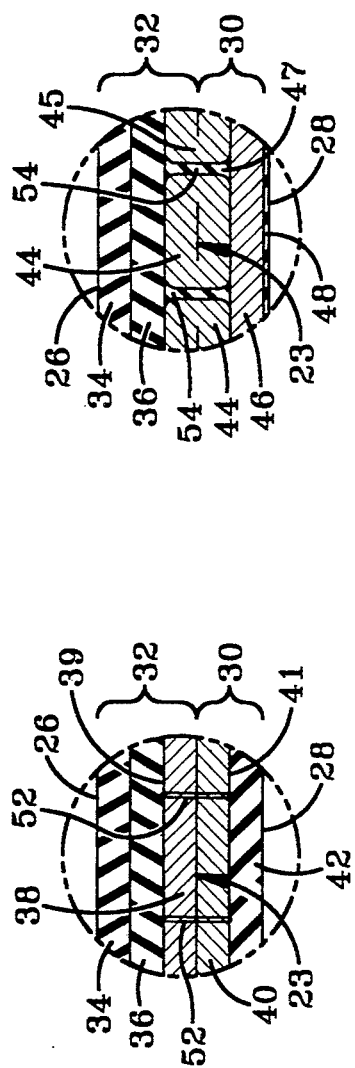

PNEUMATIC DE-ICER HAVING IMPROVED AERODYNAMIC CHARACTERISTICS

BACKGROUND OF THE INVENTION

This invention relates to aircraft de-icers and more particularly to an improved inflatable de-icer or boot adapted for attachment to the airfoil of an aircraft for use in retarding the accumulation of ice or to remove or break up ice accumulation.

Aircraft inflatable de-icers, pads or boots are made of resilient material such as rubber and attached to the leading edge of an airfoil and extend rearwardly therefrom. The de-icer has a series of inflatable passages or tubes which are distended by inflation pressure to break up ice accumulation which tends to form on the surface of the de-icer. The passages or tubes are deflated by releasing the pressure medium and drawing a vacuum thereon. The normal sequence of operation is a continuous cycling of the inflation and deflation process. An example of a de-icer in the art is presented in U.S. Pat. No. 4,779,823 PNEUMATIC DE-ICER, Ely et al. This de-icer incorporates a multitude of spanwise inflatable passages on either side of a leading edge that run parallel to the leading edge. A non-inflatable region overlies the leading edge. The inflatable passages to one side of the leading edge are cycled alternatively with the inflatable passages to the other side of the leading edge which generates a clamshell action that more effectively removes ice by cracking the ice accumulation along the leading edge. Another de-icer in the art is presented in U.S. Pat. No. 4,561,613 DEICER FOR AIRCRAFT, Weisend, Jr. This de-icer incorporates a multitude of chordwise inflatable passages that are parallel to the airstream that impinges upon the de-icer and passes around the airfoil. In general, chordwise tubes are less disruptive to the surrounding airstream that passes over the airfoil than spanwise tubes during inflation of the de-icer. Conversely, spanwise tubes remove ice much better than chordwise tubes on many airfoil geometries, particularly those geometries that have small leading edge radiuses.

Modern aircraft have flight surfaces that are sensitive to perturbations in the airstream that passes over the airfoil. Changes in an airfoil shape during inflation of a de-icer can cause undesirable changes in the aerodynamic characteristics of the airfoil. Therefore, a de-icer is desired that effectively removes ice without undesirably effecting aerodynamic characteristics.

SUMMARY OF THE INVENTION

According to an aspect of the invention, a de-icer is provided for attachment to an airfoil having first and second side portions that converge into a convex leading edge, the leading edge being subject to impingement by an airstream that passes over the airfoil, the airstream inducing a stagnation line proximate and about parallel to the leading edge, the de-icer comprising an elastomeric inner layer having an inner layer fabric, the first layer having an attachment surface adapted for attachment to the airfoil; an elastomeric outer layer having a stretchable outer layer fabric overlying and attached to the inner layer, the outer layer having an airstream surface adapted to be exposed to the airstream that passes over the airfoil, the airstream surface being spaced from and superposed over the attachment surface; a multitude of inflatable passages between the inner and outer layers that overlay the first and second side portions proximate to the leading edge, substantially all of the inflatable passages that overlay the first side portion being about parallel to the leading edge, substantially all of the inflatable passages that overlay the second side portion being about parallel to the airstream that passes over the airfoil; and, inflation means for communicating a pressurized fluid to the inflatable passages.

According to another aspect of the invention, a de-icer is provided comprising an elastomeric inner layer having an inner layer fabric; an elastomeric outer layer having a stretchable outer layer fabric overlying and attached to the inner layer, the outer layer fabric that overlies the first side portion having a first primary stretch direction, the outer layer fabric that overlies the second side portion having a second primary stretch direction, the second primary stretch direction being misaligned with the first primary stretch direction, the first primary stretch direction meeting the second primary stretch direction about parallel and proximate to the stagnation line, the inner layer being sewn to the outer layer in a predetermined pattern that forms a multitude of inflatable passages between the inner and outer layers that overlay the first and second side portions proximate to the leading edge; and, inflation means for communicating a pressurized fluid to the inflatable passages.

In either of the previous two aspects, the de-icer can further comprise a pair of spaced margins to either side of the stagnation line and parallel thereto, the area between the spaced margins defining a non-inflatable region, wherein the inflatable passages that overlay the first side portion and the inflatable passages that overlay the second side portion abut the non-inflatable region along the spaced margins.

A method of building a de-icer is also provided comprising the steps of forming a first carcass by sewing two first carcass fabric layers together in a predetermined pattern that forms inflatable passages between the two first carcass fabric layers, the predetermined pattern comprising elongate passages in side-by-side relationship in a first common direction, the first carcass having a first carcass perimeter including a first edge, a first carcass inner side and an opposing first carcass outer side; forming a second carcass by sewing two second carcass fabric layers together in a predetermined pattern that forms inflatable passages between the two second carcass fabric layers, the predetermined pattern comprising elongate passages in side-by-side relationship in a second common direction, the second carcass having a second carcass perimeter including a second edge, a second carcass inner side and an opposing second carcass outer side; abutting the first carcass and the second carcass along the first and second edges, the first common direction being substantially misaligned with the second common direction; applying and bonding an attachment layer comprising elastomeric material to the first and second inner carcass sides, the inner layer having a perimeter that extends beyond the first and second carcass perimeters; and applying and bonding a surface layer comprising elastomeric material to the first and second outer carcass sides, the outer layer having a perimeter that extends beyond the first and second carcass perimeters.

Another method of building a de-icer is provided, comprising the steps of forming a first carcass by sewing two first carcass fabric layers together in a predetermined pattern that forms inflatable passages between the first carcass layers, the first carcass having a first primary stretch direction, a first carcass perimeter including a first edge, a first carcass inner side and an opposing first carcass outer side; forming a second carcass by sewing two second carcass fabric layers together in a predetermined pattern that forms inflatable passages between the two second carcass fabric layers, the second carcass having a second primary stretch direction, a second carcass perimeter including a second edge, a second carcass inner side and an opposing second carcass outer side; abutting the first carcass and the second carcass along the first and second edges, the first primary stretch direction being substantially misaligned with the second primary stretch direction; applying and bonding an attachment layer comprising elastomeric material to the first and second inner carcass sides, the inner layer having a perimeter that extends beyond the first and second carcass perimeters; and applying and bonding a surface layer comprising elastomeric material to the first and second outer carcass sides, the outer layer having a perimeter that extends beyond the first and second carcass perimeters.

Either of the previous two methods can further comprise the step of forming a non-inflatable region having a width that extends into the first and second carcasses on either side of the first and second edges by bonding a thin elastomeric strip between the two fabric layers of the first and second carcasses along the first and second edges, the thin elastomeric strip having a total width approximately corresponding to the non-inflatable region width.

BRIEF DESCRIPTION OF THE DRAWINGS

FIG. 5 is a sectional view across the full deicer of FIG. 3 perpendicular to the leading edge.

FIG. 6 is a sectional view parallel to leading edge through the de-icer over the inflatable passages that are parallel to the leading edge.

FIG. 7 is a sectional view parallel to leading edge through the de-icer over inflatable passages that are parallel to the airstream.

FIG. 8 is a first alternative for forming the inflatable passages.

FIG. 9 is a second alternative for forming the inflatable passages.

DETAILED DESCRIPTION

Figure 1:
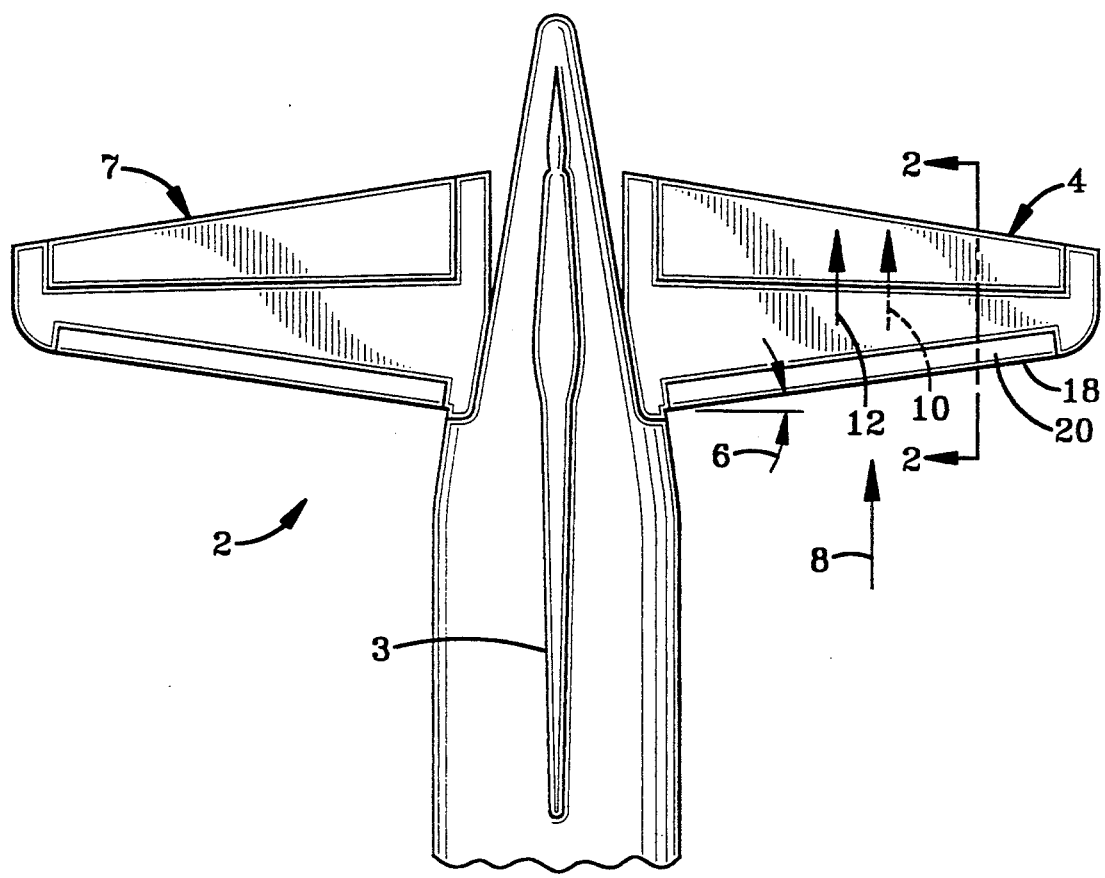
FIG. 1 is a plan view of an aircraft tail section.

The invention is presented in FIGS. 1 through 13, wherein like numbered components in the various views are equivalent. Referring to FIG. 1, an aircraft tail section 2 is presented in plan view. Aircraft tail section 2 comprises a vertical tailplane 3 and two horizontal tailplanes 4 and 7. A de-icer 20 according to the invention is shown attached to the forward portion of tailplane 4. Though shown attached to a tailplane, de-icer 20 can also be adapted to another aircraft flight surface such as a wing. An airstream 8 impinges upon a leading edge 18 and splits into first airstream 10 and a second airstream 12 that pass over the tailplane 4. The leading edge 18 of tailplane 4 forms a sweep angle 6. Airstream 10 is shown as a dashed line since it passes over the opposite side of tailplane 4 out of view.

Figure 2:
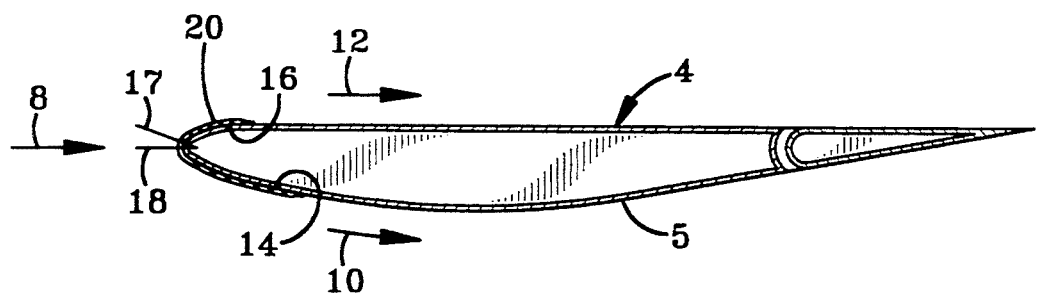
FIG. 2 is a sectional view of an aircraft tailplane parallel to an airstream that passes around the airfoil.

Referring now to FIG. 2, a sectional view of tailplane 4 parallel to the airstream 8 is presented. The tailplane 4 is generally shaped as an airfoil 5 and has a first side portion 14 and a second side portion 16 that converge into a convex leading edge 18. A stagnation line 17 forms near leading edge 18 where airstream 8 splits into first and second airstreams 10 and 12. The stagnation line 17 is about parallel to the leading edge 18 and is normally shifted a short distance to one side (however, the stagnation line could directly overlay the leading edge 18 with some airfoil geometries). The airfoil 5 is shown inverted such that a downward force is generated on the tailplane 4 while the aircraft is in flight. This arrangement appears on many regional airline type aircraft, but in no way limits the invention. Many other aircraft have conventionally oriented (non-inverted) tailplane airfoils that generate an upward force upon which the invention should have equal utility. First airstream 10 passes over the first side portion 14, and second airstream 12 passes over the second side portion 16. De-icer 20 is shown mounted on an existing airfoil 5 such that the de-icer 20 slightly alters the intended shape of airfoil 5. This can be avoided by appropriately recessing the airfoil 5 such that the exposed surface of de-icer 20 conforms with the intended airfoil shape.

Figure 3:
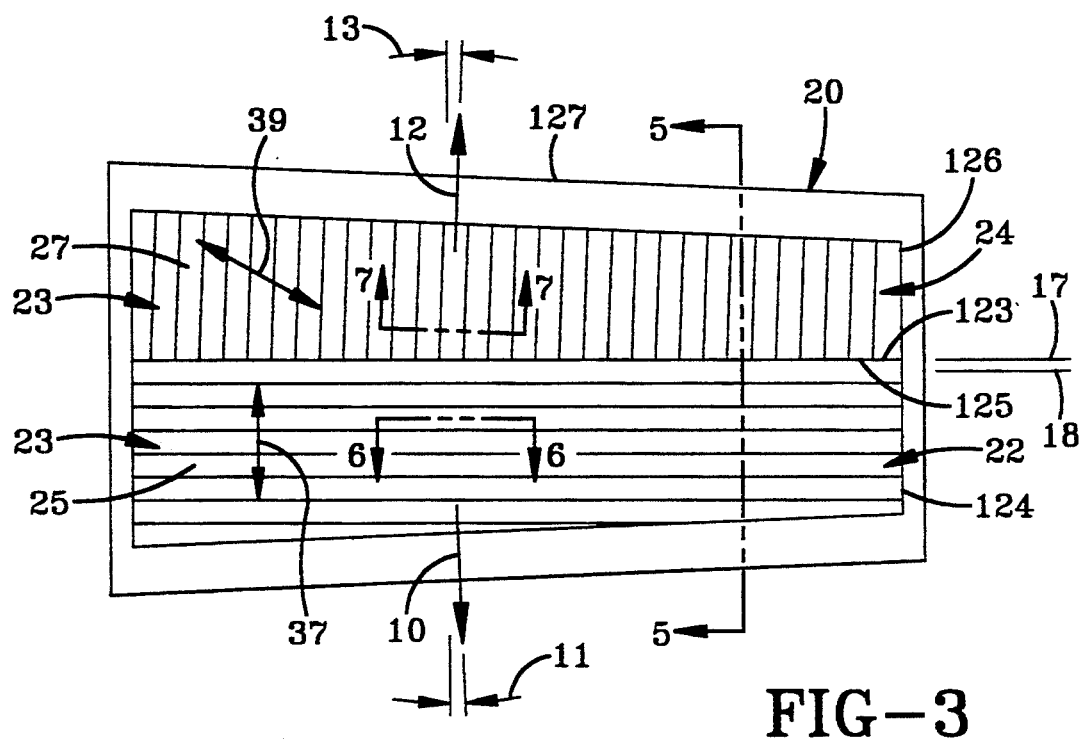
FIG. 3 is a plan view of a de-icer according to the invention.

De-icer 20 is shown in plan view in FIG. 3. In plan view, airstream 10 forms an angle 11 with a line perpendicular to leading edge 18 and airstream 12 forms an angle 13 with a line perpendicular to the leading edge 18, angles 11 and 13 approximating the sweep angle 6 (FIG. 1). Stagnation line 17 is shown shifted a short distance from leading edge 18. A multitude of inflatable passages 23 overlay the first and second side portions 14 and 16 proximate to the leading edge 18 when de-icer 20 is attached the tailplane 4. Some inflatable 10 passages 22 overlay the first side portion 14 (FIG. 2) when the de-icer 20 is installed. Substantially all of the inflatable passages 22 that overlay the first side portion 14 are about parallel to the leading edge 18. The term "about parallel" is used to indicate that inflatable passages 22 could form some small angle with the leading edge 18 which is intended to be within the purview of this invention. Some inflatable passages 24 overlay the second side portion 16 (FIG. 2) when the de-icer 20 is installed. Substantially all of the inflatable passages that overlay the second side portion 24 are about parallel to the first airstream 12 (which is parallel to airstream 8). The term "about parallel" is used to indicate that inflatable passages 24 could form some small angle with the airstream 12 which is intended to be within the purview of this invention. Likewise, the term "substantially" is intended to indicate that nearly all of the inflatable passages conform as described. For example, inflatable passages 24 could extend a short distance past stagnation line 17 over first side portion 14, or inflatable passages 22 could extend a short distance past stagnation line 17 over the second side portion 16.

An important feature of the invention is now apparent. Inflatable passages 24 (parallel to the airstream) disrupt second airstream 12 less than inflatable passages 22 (parallel to the leading edge) disrupt first airstream 10 when the tubes are inflated. In general, inflatable passages that are parallel to the airstream are less disruptive and have much less effect on the intended aerodynamic characteristics of an airfoil while the de-icer is inflated. However, de-icing tests have demonstrated that for many airfoil geometries, particularly those having small leading edge radiuses, inflatable passages parallel to a leading edge are more effective in removing ice than inflatable passages parallel to the airstream. Since airflow over one side of an airfoil is generally more critical than airflow over the opposite side of the airfoil, inflatable passages that overlay the critical side can be arranged about parallel to the airstream. The rest of the inflatable passages can remain parallel to the leading edge. The resulting de-icer preserves ice removal capability but should also preserve the intended aerodynamic characteristics of the airfoil during de-icer inflation. The inflatable passages that are parallel to the airstream could overlay either side of the airfoil depending on the application. The inflatable passages that overlay the other side of the airfoil remain parallel to the leading edge. Which of the two opposing airfoil surfaces is critical depends upon the aerodynamic characteristics of the particular flight surface and its interaction with the entire aircraft.

A sectional view across the full de-icer perpendicular to leading edge 18 is presented in FIG. 5. De-icer 20 comprises elastomeric inner layer 30 which is attached to elastomeric outer layer 32, and inflatable passages 22 and 24 between the inner and outer layers 30 and 32. Inner layer 30 includes inner layer fabric 40 and airfoil attachment layer 42, and an attachment surface 28. Outer layer 32 includes outer layer fabric 38, resilient layer 36, erosion layer 34, and airstream surface 26. The airstream surface 26 is spaced from and superposed over the attachment surface 28. Attachments 50 join the inner layer 30 to the outer layer 32 in a manner that defines the multitude of inflatable passages 22 and 24. Inflation means for communicating a pressurized fluid to inflatable passages 24 comprises a manifold 56 which includes a bleeder strip 58 bounded by two tapered fillets 60 having a thickness that decreases with distance from the bleeder strip 58. Manifold 56 is included within inner layer 30 and extends along de-icer 20 approximately parallel to leading edge 18 beneath inflatable passages 24. An air connection opening 64 is formed through inner layer 30 and an air connection 62 is bonded to the attachment surface 28 over the opening 64. Openings 66 are formed in inner layer fabric 40 at spaced intervals along the de-icer 20. Upon introduction of a pressurized fluid, such as air, into air connection 62, the pressurized fluid passes into the bleeder strip 58 which distributes the pressurized fluid along the length of de-icer 20, the pressurized fluid then passes into the inflatable passages through the openings 66 and inflates the inflatable passages 24. Materials for forming manifolds are well known in the pneumatic de-icer art. As will be discussed, the manifold is optional with a sewn-type de-icer. The perimeter of the de-icer is preferably tapered as shown.

A sectional view parallel to leading edge 18 through de-icer 20 over inflatable passages 22 is presented in FIG. 6. As before, de-icer 20 comprises elastomeric inner layer 30 and elastomeric outer layer 32. Inflatable passages 22 lie between the inner and outer layers 30 and 32. Inner layer 30 includes attachment layer 42 and inner layer fabric 40. Outer layer 32 includes outer layer fabric 38, elastomeric resilient layer 36 and elastomeric erosion layer 34. Inflation means for communicating a pressurized fluid to the inflatable passages 22 comprises inflation manifold 78 which is very similar to inflation manifold 56. Manifold 78 includes a bleeder strip 68 bounded by two tapered fillets 70 having a thickness that decreases with distance from the bleeder strip 68. Manifold 78 is included within inner layer 30 and extends along de-icer 20 beginning close to the leading edge 18 and extending aft approximately perpendicular to leading edge 18 beneath inflatable passages 22. An air connection opening 74 is formed through inner layer 30 and an air connection 72 is bonded to the attachment surface 28 over the opening 74. Openings 76 are formed in inner layer fabric 40 at spaced intervals along the de-icer 20. Upon introduction of a pressurized fluid, such as air, into air connection 72, the pressurized fluid passes into the bleeder strip 68 which distributes the pressurized fluid along the width of de-icer 20, the pressurized fluid then passes into the inflatable passages through the openings 66 and inflates the inflatable passages 24. As will be discussed, the manifold is optional with a sewn type de-icer.

A sectional view parallel to leading edge 18 through de-icer 20 over inflatable passages 24 is presented in FIG. 7. As before, de-icer 20 comprises inner layer 30 which is attached to outer layer 32. Inflatable passages 24 lie between inner and outer layers 30 and 32. Attachments 50 join the inner layer 30 to the outer layer 32 in a manner that defines the inflatable passages 24. Inner layer 30 includes attachment layer 42 and inner layer fabric 40. Outer layer 32 includes outer layer fabric 38, elastomeric resilient layer 36 and elastomeric erosion layer 34.

Two alternatives for forming inflatable passages 23 are presented in FIGS. 8 and 9. FIG. 8 represents a sewn-type de-icer which is preferred. Inner layer fabric 40 and stretchable outer layer fabric 38 are coated on one surface with elastomeric material. The uncoated surfaces are placed immediately adjacent each other and the two layers are sewn together in a predetermined pattern that defines the multitude of inflatable passages 23. The facing fabric surfaces can be napped to facilitate flow of pressurized fluid (such as air) to the inflatable passages 23. Attachments 52 are parallel rows of stitching. A resilient layer 36 is bonded to outer layer fabric 38 and erosion layer 34 is bonded to resilient layer 36. Inner layer fabric 40 is bonded to attachment layer 42. Outer layer fabric 38 is preferably a tricot woven polyamide (nylon) fabric coated on one surface with natural rubber. Inner layer fabric 40 is preferably a square woven polyamide (nylon) fabric coated on one surface with natural rubber. The two layers are preferably sewn together with polyamide (nylon) thread. Attachment layer 42 is preferably a chloroprene rubber. Erosion layer 34 is preferably either choloroprene rubber or polyurethane elastomer, either material being suitable as an erosion surface, with polyurethane elastomer generally having better resistance to rain and sand erosion.

Cement layers (not shown) are provided between the various layers (except between the inner and outer fabric layers 38 and 40) that bond the de-icer into a cohesive unit. Appropriate tie-in cements are also necessary between layers having dissimilar materials. Suitable elastomer compounds, fabrics, bond cements, and tie-in cements are well known in the pneumatic de-icer art. The de-icer is preferably cured under heat and pressure in an autoclave. A nominal thickness of the de-icer between the airstream surface 26 and attachment surface 28 is about 0.075 to 0.090 inch after cure. With a sewn type de-icer, the pressurized fluid can pass through the stitched attachments 50. Therefore, openings 66 and 76 (FIGS. 5 and 6) can be spaced along the manifold every third or fourth inflatable passage (or as required by the particular application). Also, manifolds 56 and 78 may not be necessary, in which case, the inflation means would only require openings 64 and 74 and air connections 62 or 72.

Referring to FIG. 9, an alternate tube-type de-icer 20 embodiment is presented. Strips of stretchable fabric coated on at least one surface with elastomeric material are wrapped into flattened tubes having opposing walls 44 joined by folds 45. One of opposing walls 44 forms a part of inner layer 30, the other of the opposing walls 44 forms a part of outer layer 32. Narrow elastomeric strips 47 are placed between the individual tubes. Attachments 54 are the folds 45 between the tube walls 44 and include strips 47. The resilient layer 36 is bonded to the tubes. The erosion layer 34 is bonded to the resilient layer 36. An inextensible fabric layer 46 is bonded to the other side of the tubes. A thin elastomeric attachment layer 48 is bonded to inextensible fabric layer 46. The stretchable tube fabric is preferably a tricot woven polyamide (nylon) fabric coated on at least one surface with natural rubber. The tube is preferably rolled with the fabric surface inside the tube. If the tube is coated on both surfaces, a release material such as soapstone must be provided inside the tube. The thin elastomeric strips 47 are preferably formed from natural rubber. Inextensible fabric layer 46 is preferably a square woven polyamide (nylon) fabric coated on both sides with natural rubber. Thin attachment layer 28 is preferably formed by applying dissolved chloroprene rubber to fabric layer 46 and evaporating the solvent. As before, erosion layer 34 is preferably either chloroprene rubber or polyurethane elastomer. Resilient layer 36 is preferably natural rubber. The layers are bonded together using appropriate cements. Appropriate tie-in cements are also necessary between layers having dissimilar materials. Suitable elastomer compounds, fabrics, bond cements, and tie-in cements are well known in the pneumatic de-icer art. The construction is preferably cured under heat and pressure. A nominal thickness of the de-icer between the airstream surface 26 and attachment surface 28 is about 0.09 to 0.13 inch after cure. In a tube-type de-icer, inflation manifolds 56 and 78 are necessary. Openings 66 and 76 must be provided in each inflatable passage.

Figure 4:
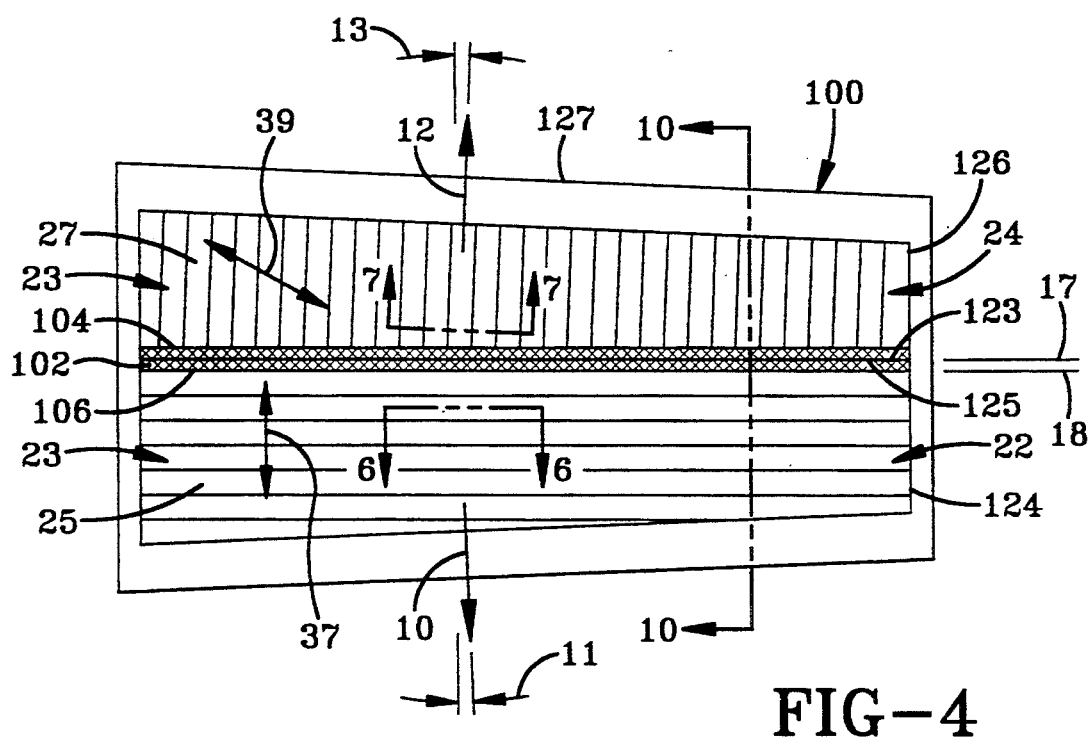
FIG. 4 is a plan view of a de-icer according to a preferred embodiment of the invention.

A preferred embodiment of the invention is presented in FIG. 4. Preferred de-icer 100 is very similar to de-icer 20. A sectional view parallel to leading edge 18 through de-icer 100 over inflatable passages 22 is identical to the corresponding sectional view for de-icer 20 presented in FIG. 6. A sectional view parallel to leading edge 18 through de-icer 100 over inflatable passages 24 is identical to the corresponding sectional view for de-icer 20 presented in FIG. 7. As before, two alternatives for forming inflatable passages 23 are presented in FIGS. 8 and 9, with the sewn embodiment of FIG. 8 being preferred. In contrast to de-icer 20, de-icer 100 includes two spaced margins 104 and 106 on either side of stagnation line 17 defining a non-inflatable region 102. Inflatable passages 24 abut the non-inflatable region 102 along spaced margin 104, and inflatable passages 22 abut the non-inflatable region 102 along the other spaced margin 106. The non-inflatable region 102 improves the de-icing capability of de-icer 100 by inducing a clamshell action that splits an ice cap along the stagnation line 17 upon inflation of the inflatable passages 23. The structure and function of a "clamshell" de-icer is fully described in U.S. Pat. No. 4,779,823 PNEUMATIC DEICER, Ely et al., issued Oct. 25, 1988, the teachings of which are fully incorporated by reference as if set forth herein. The width of non-inflatable region 102 is preferably about 0.5 inch.

Figure 10:
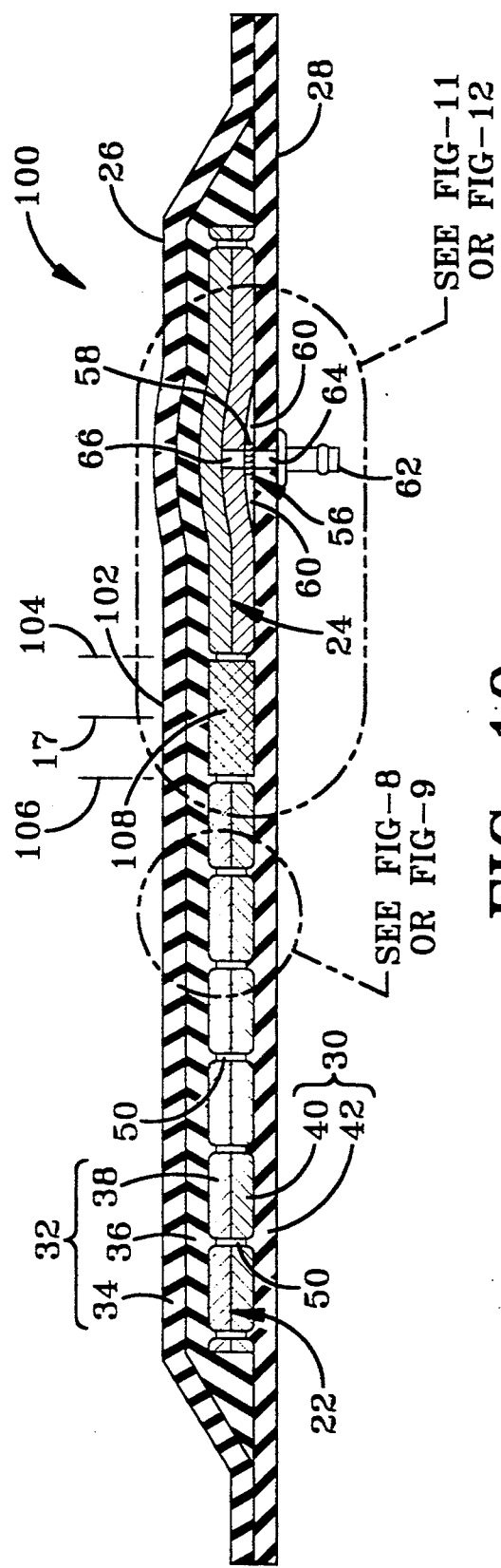
FIG. 10 is a sectional view across the full de-icer of FIG. 4 perpendicular to the leading edge.

A sectional view across the full de-icer 100 perpendicular to leading edge 18 is presented in FIG. 10. Two alternatives for forming inflatable passages 23 are presented in FIGS. 8 and 9 which represent sewn-type and tube-type de-icer constructions. Referring to FIG. 10, the boundaries of non-inflatable region 102 are defined by spaced margins 104 and 106. Dead strip 108 separates inflatable passages 24 from inflatable passages 22 and is not inflatable. Two alternatives for forming non-inflatable region 102 are presented in FIGS. 11 and 12. A preferred embodiment is presented in FIG. 11 for use in the sewn-type de-icer construction of FIG. 8. Inner layer fabric 40 and outer layer fabric 38 are immediately adjacent and sewn together at attachment points 52, as previously discussed in relation to FIG. 8. The inner layer fabric 40 and outer layer fabric 38 that overlay the first side portion 14 (FIG. 2) form a first carcass that is sewn together in a predetermined pattern of inflatable passages 22. The inner layer fabric 40 and outer layer fabric 38 that overlay the second side portion 16 (FIG. 2) form a second carcass that is sewn together in a predetermined pattern of inflatable passages 24. The first and second carcasses are separate and distinct and each have a coextensive edge 123 and 125 along which each abuts the other in the non-inflatable region 102. The sewn attachments 52 immediately adjacent the non-inflatable zone 102 correspond to the locations of the spaced margins 104 and 106. A narrow strip of elastomeric material 118 lies between the inner and outer layer fabrics 40 and 38 and bonds the two fabric layers together. The narrow strip 118 has a width that approximates the distance between spaced margins 104 and 106, and is preferably formed from natural rubber. As discussed previously in relation to FIG. 8, manifold 56 is optional.

Figure 12:
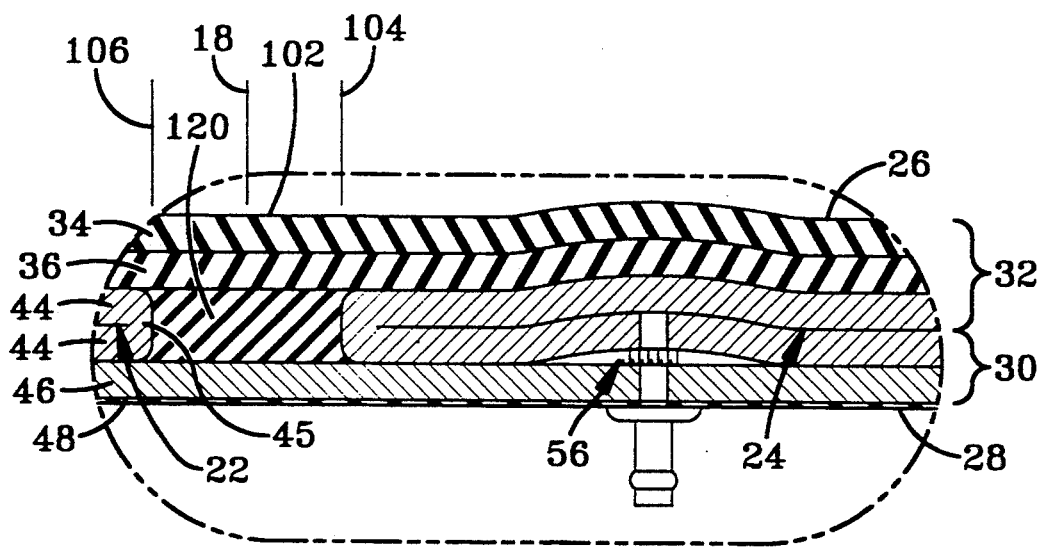
FIG. 12 is an alternate embodiment for attaching the inner and outer layers.

An alternate embodiment is presented in FIG. 12 for use in the tube-type de-icer construction of FIG. 9. Strips of stretchable fabric coated on at least one surface with elastomeric material are wrapped into flattened tubes having opposing walls 44 joined by folds 45. These flattened tubes form inflatable passages 22 and 24. An elastomeric filler strip 120 having the same thickness as the tubes divides inflatable passages 22 from inflatable passages 24. Examples of suitable material for elastomeric filler strip 120 include natural rubber and chloroprene rubber. The edges of the tubes forming inflatable passages 22 and 24 correspond to the locations of the spaced margins 104 and 106. The width of filler strip 120 approximates the width of non-inflatable zone 102.

Figure 13:
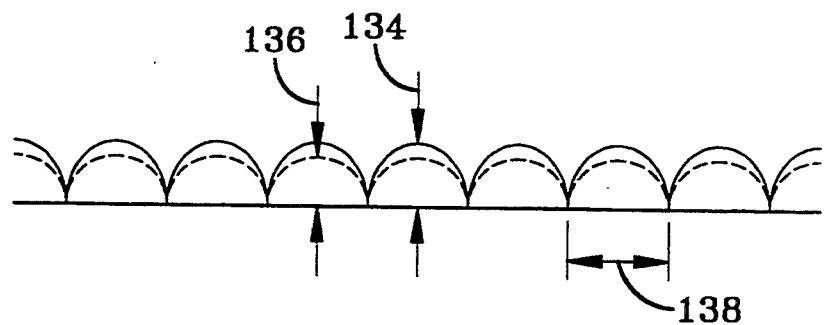
FIG. 13 is a schematic view showing inflatable passage inflation height.
Figure 14:
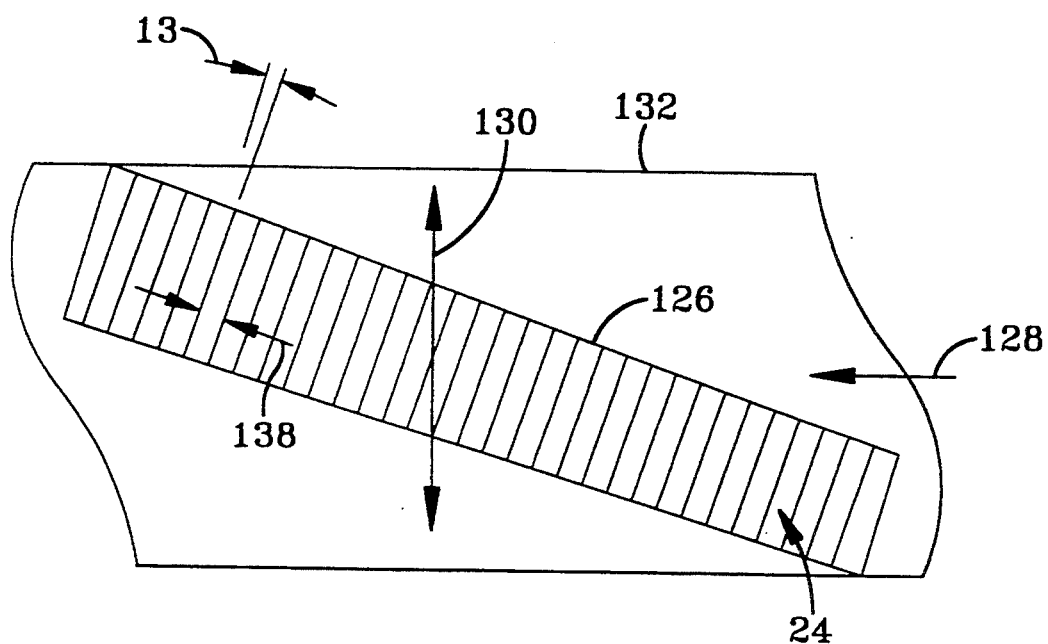
FIG. 14 is a plan view of inflatable passages laid-out on a stretchable fabric having a primary stretch direction across the fabric width.

In order to obtain the most effective de-icing action, a maximum tube inflation height 134 must be achieved as depicted in FIG. 13. This inflation height is ideally between about 0.25 to 0.35 inch at room temperature. Tricot fabric, which is preferably used for the outer layer stretchable fabric, has a primary stretch direction in which the material stretches a maximum amount. If the primary stretch direction is approximately aligned with the inflatable passage width, inflation height 134 is mostly a function of three variables: inflation pressure, inflatable passage width 138, and the specific materials used to construct the deicer. Inflatable passage width 138 ranges from about 0.75 inch to 1.75 inch as required by the three variables. Referring to FIG. 14, the primary stretch direction 130 is usually across the fabric width perpendicular to the direction 128 from which the fabric comes off the roll. Ideally, the primary stretch direction is oriented across the width 138 of the inflatable passage. This optimum arrangement is not difficult to achieve with inflatable passages that are about parallel the leading edge, for example inflatable passages 22 of FIGS. 3 and 4. Inflatable passages 22 of nearly any length could be formed from stretchable fabric 130 which would result in a first primary stretch direction 37 as shown in FIG. 3 and 4.

In contrast, aligning the primary stretch direction of inflatable tubes 24 is difficult if the length of the de-icer is greater than the width of stretchable fabric 132, as shown in FIG. 14. Several pieces of stretchable fabric with the stretch in the desired direction could be spliced together, but this approach is undesirable since it results in higher cost and complexity. In order to avoid splices while optimizing inflation height, the predetermined tube pattern of inflatable passages 24 can be oriented at an angle relative to the direction 128 the fabric comes off the roll as shown in FIG. 14. Since de-icers are usually much longer than the width of fabric 132, the tube pattern is optimally placed on as much of an angle as possible. The angle 13 (FIGS. 3 and 4) can be advantageously used to more closely align the stretch direction 130 across the widths 138 of the inflatable passages. However, in most instances a perfect alignment cannot be achieved and the misalignment results in a lower tube inflation height 136 as shown in FIG. 13. Maintaining tube inflation height is especially critical with a "clamshell" de-icer (FIG. 4). Inflation height may be further optimized and the misalignment can be compensated by increasing the inflatable passage width, which increases inflation height. The widths of the inflatable passages are increased to achieve inflation heights equivalent to inflation heights that would be achieved if the primary stretch direction were aligned with the widths of the inflatable passages. For example, for a given set of de-icer materials and an inflation pressure of 21 psig, a 1.0 inch wide tube would provide sufficient inflation height if the stretch direction were aligned with the inflatable passage width. In an embodiment similar to FIG. 4, second primary stretch direction 39 formed an angle of about 13 (thirteen) degrees with the inflatable passage width which was compensated by increasing the tube width to about 1.25 inch. The increase in width increased the inflation height to the desired level.

Regardless of the specific embodiment, the first primary stretch direction 37 is misaligned with the second primary stretch direction 39 in de-icers 20 or 100 of FIGS. 3 and 4. The first primary stretch direction meets the second primary stretch direction proximate and about parallel to the stagnation line 17. The angle of misalignment is usually substantial since the airstream 8, with which inflatable passages 24 are aligned, is usually nearly perpendicular to the leading edge 18, with which inflatable passages 22 are aligned. In a sewn type de-icer, which is preferred, inflatable passages 22 and 24 must be formed as separate carcasses with different primary stretch directions. A sewn type de-icer may be constructed according to the following method.

A first carcass 25 (FIGS. 3 and 4) is formed by sewing two first carcass fabric layers (inner layer 40 and outer stretchable layer 38 as shown in FIG. 8) together in a predetermined pattern that forms inflatable passages 23 between the two first carcass fabric layers. Referring to FIGS. 3 and 4, the predetermined pattern comprises elongate inflatable passages 22 in side-by-side relationship in a first common direction about parallel to leading edge 18. The first carcass 25 has a first primary stretch direction which is aligned as closely as possible with the width of the inflatable passages 22. The first carcass 25 has a first carcass perimeter 124 including a first edge 123, a first carcass inner side (corresponding to the inner side 41 of inner fabric layer 40 as shown in FIG. 8) and an opposing first carcass outer side (corresponding to the outer side 39 of outer fabric layer 38 as shown in FIG. 8). A second carcass 27 (FIGS. 3 and 4) is formed by sewing two second carcass fabric layers (inner fabric layer 40 and outer stretchable fabric layer 38 as shown in FIG. 8) together in a predetermined pattern that forms inflatable passages 23 between the two second carcass fabric layers. Referring to FIGS. 3 and 4, the predetermined pattern comprises elongate inflatable passages 24 in side-by-side relationship in a second common direction about parallel to airstream 12. The second carcass 27 has a second primary stretch direction 39 which is aligned as closely as possible with the width of the inflatable passages 24. The second carcass 27 has a second carcass perimeter 126 including a second edge 125, a second carcass inner side (corresponding to first carcass inner side 41 as shown in FIG. 8) and an opposing second carcass outer side (corresponding to second carcass inner side 39 as shown in FIG. 8). The first carcass 25 and second carcass 27 are then abutted along the first and second edges 123 and 125 which are coextensive. The two carcasses abutt about parallel and proximate to stagnation line 17. As discussed previously, the first common direction is misaligned with the second common direction. Likewise, the first primary stretch direction 37 is misaligned with the second primary stretch direction 39. The attachment layer 42 (FIG. 8) is applied and bonded to the first and second inner carcass sides 41 (FIG. 8). The attachment layer 42 has a perimeter 127 that extends beyond the first and second carcass perimeters 124 and 126. A surface layer (resilient layer 36 and erosion layer 34 of FIG. 8) is applied and bonded to the first and second outer carcass sides 39 (FIG. 8). The surface layer has a perimeter 127 that extends beyond the first and second carcass perimeters 124 and 126, as shown in FIGS. 3 and 4.

Figure 11:
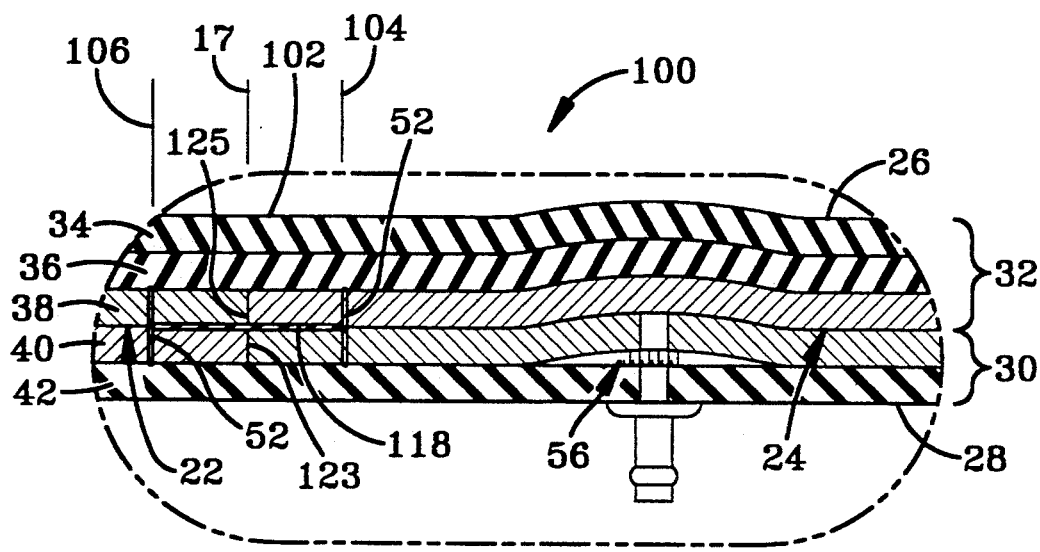
FIG. 11 is a preferred embodiment wherein the inner layer fabric and outer layer fabric are immediately adjacent and sewn together.

If a de-icer 100 is being constructed, non-inflatable region 102 has a width that extends into the first and second carcasses 25 and 27 on either side of the first and second edges 123 and 125 as depicted in FIG. 4. The non-inflatable region is formed by inserting and bonding a thin elastomeric strip 118 between the two fabric layers of the first and second carcasses 25 and 27 along the first and second edges 123 and 125 as depicted in FIGS. 4 and 11. Thin elastomeric strip 118 has a total width that approximately corresponds to the non-inflatable region width between spaced margins 104 and 106.

According to a preferred method of construction, carcasses 25 and 27 are formed as described above. Erosion layer 34 is applied to a polished stainless steel sheet. Resilient layer 36 is applied over the erosion layer 34. Carcasses 25 and 27 are then abutted along first and second edges 123 and 125 along stagnation line 17 and applied to the resilient layer 36 with the stretchable outer fabric layer immediately adjacent the resilient layer 36. The inner layer fabric 38 is then peeled back along first and second edges 123 and 125 and a elastomeric strip 118 is applied to the stretchable fabric layer 40 in the non-inflatable region 102 using appropriate adhesive. The inner layer fabric 38 is then pushed back down over the elastomeric strip which creates the construction shown in FIG. 11. If required, manifolds 56 (FIGS. 5 and 10) and 78 (FIG. 6) are then applied to the inner layer fabric along with the appropriate openings 64, 66, 74 and 76. Attachment layer 42 is then applied over the entire construction. Appropriate bond cements and tie-in cements are used in between the various layers as previously discussed. A vacuum bag is applied over the construction and sealed to the stainless steel sheet around the perimeter of the de-icer which is subsequently cured under heat and pressure. Air connections 62 and 72 are bonded over openings 64 and 74 using an air cure adhesive. Suitable elastomer compounds, fabrics, bond cements, and tie-in cements are well known in the pneumatic de-icer art.

The de-icer is preferably attached to the airfoil using a solvent based rubber adhesive. A very desirable adhesive is catalogue number 1300L available from the Minnesota Mining and Manufacturing Company, St. Paul, Minn., U.S.A., if the attachment surface of the de-icer is chloroprene rubber. Methods for attaching de-icers to airfoils are well known in the art. In operation on the aircraft, all of the inflatable passages 23 can be inflated simultaneously. Inflation can also alternate between inflatable passages that overlay the first side portion 22 and inflatable passages that overlay the second side portion 24. Compressed air is normally used to inflate the de-icer, but other pressurized fluids could be used. Equipment for inflating de-icers and controlling inflation cycles is well known in the art.

It will be apparent that, although a specific embodiment and modifications thereof have been described, the invention is not limited to the specifically illustrated and described constructions since variations may be made without departing from the principles of the invention.

We claim:

1. A de-icer for attachment to an airfoil having first and second side portions that converge into a convex leading edge, the airfoil having a stagnation line induced by an airstream that impinges upon the leading edge and passes around the airfoil, comprising:
   (a) an elastomeric inner layer having an inner layer fabric;
   (b) an elastomeric outer layer having a stretchable outer layer fabric overlying and attached to said inner layer, said inner layer being sewn to said outer layer in a predetermined pattern that forms a multitude of inflatable passages between said inner and outer layers that overlay the first and second side portions proximate to the leading edge,
   said outer layer fabric that overlies said first side portion having a first primary stretch direction in which said outer layer fabric that overlies said first side portion stretches a maximum amount, said first primary stretch direction being oriented relative to said multitude of inflatable passages to optimize inflation height,
   said outer layer fabric that overlies said second side portion having a second primary stretch direction in which said outer layer fabric that overlies said second side portion stretches a maximum amount, said second primary stretch direction being oriented relative to said multitude of inflatable passages to optimize inflation height,
   said second primary stretch direction being misaligned with said first primary stretch direction, said first primary stretch direction meeting said second primary stretch direction about parallel and proximate to the stagnation line; and,
   (c) inflation means for communicating a pressurized fluid to said inflatable passages.

2. The de-icer of claim 1 wherein said inflatable passages that overlay the first side portion and said inflatable passages that overlay the second side portion abut over the stagnation line.

3. The de-icer of claim 1 further comprising a pair of spaced margins to either side of the stagnation line and parallel thereto, the area between said spaced margins defining a non-inflatable region, wherein said inflatable passages that overlay the first side portion and said inflatable passages that overlay the second side portion abut said non-inflatable region along said spaced margins.

4. The de-icer of claim 1 wherein said predetermined pattern comprises a pattern of elongate inflatable passages in side-by-side relationship, each of said elongate inflatable passages having a width, said widths of said inflatable passages that overlay the first side portion are approximately aligned with said first primary stretch direction, said widths of said inflatable passages that overlay the second side portion are misaligned with said second primary stretch direction, said widths of said inflatable passage that overlay the second side portion are increased to achieve an inflation height equivalent to an inflation height that would be achieved if said second primary stretch direction were aligned with said widths of said inflatable passages that overlay the second side portion.

5. The de-icer of claim 1 wherein said predetermined pattern comprises a pattern of elongate inflatable passages in side-by-side relationship, each of said elongate inflatable passages having a width, said widths of said inflatable passages that overlay the first side portion are approximately aligned with said first primary stretch direction, and said widths of said inflatable passages that overlay the second side portion are approximately aligned with said second primary stretch direction.

6. The de-icer of claim 1 wherein said predetermined pattern comprises a pattern of elongate inflatable passages in side-by-side relationship, each of said elongate inflatable passages having a width, said widths of said inflatable passages that overlay the first side portion are approximately aligned with said first primary stretch direction, and said widths of said inflatable passages that overlay the second side portion are misaligned with said second primary stretch direction.

7. A method of building a de-icer, comprising the steps of:
   forming a first carcass by sewing two first carcass fabric layers together in a predetermined pattern that forms inflatable passages between said first carcass layers, said first carcass having a first carcass perimeter including a first edge, a first carcass inner side and an opposing first carcass outer side, said first carcass fabric layer adjacent said first carcass outer side having a first primary stretch direction in which it stretches a maximum amount, said first primary stretch direction being oriented relative to said multitude of inflatable passages to optimize inflation height;

forming a second carcass by sewing two second carcass fabric layers together in a predetermined pattern that forms inflatable passages between said two second carcass fabric layers, said second carcass having a second carcass perimeter including a second edge, a second carcass inner side and an opposing second carcass outer side, said second carcass fabric layer adjacent said second carcass outer side having a second primary stretch direction in which it stretches a maximum amount, said second primary stretch direction being oriented relative to said multitude of inflatable passages to optimize inflation height;

abutting said first carcass and said second carcass along said first and second edges, said first primary stretch direction being misaligned with said second primary stretch direction;

bonding an attachment layer comprising elastomeric material to said first and second inner carcass sides, said inner layer having a perimeter that extends beyond said first and second carcass perimeters; and bonding a surface layer comprising elastomeric material to said first and second outer carcass sides, said outer layer having a perimeter that extends beyond said first and second carcass perimeters.

8. The method of claim 2 wherein said first carcass predetermined pattern comprises a pattern of elongate inflatable passages in side-by-side relationship, each of said first carcass inflatable passages having a width, said widths of said first carcass inflatable passages are approximately aligned with said first primary stretch direction;

said second carcass predetermined pattern comprises a pattern of elongate inflatable passages in side-by-side relationship, said widths of said second carcass inflatable passages are misaligned with said second primary stretch direction; and said widths of said second carcass inflatable passages are increased to achieve inflation heights equivalent to inflation heights that would be achieved if said second primary stretch direction were aligned with said widths of said second carcass inflatable passages.

9. The method of claim 7 wherein the de-icer is adapted for attachment to an airfoil having a stagnation line induced by an airstream that impinges upon the leading edge and passes around the airfoil, further comprising the step of abutting said first and second carcasses along said first and second edges about parallel and proximate to the stagnation line.

10. The method of claim 7, further comprising the step of forming a non-inflatable region having a width that extends into said first and second carcasses on either side of said first and second edges by bonding a thin elastomeric strip between said two fabric layers of said first and second carcasses along said first and second edges, said thin elastomeric strip having a width approximately corresponding to said non-inflatable region width.

11. The method of claim 10 wherein said first carcass predetermined pattern comprises a pattern of elongate inflatable passages in side-by-side relationship, each of said first carcass inflatable passages having a width, said widths of said first carcass inflatable passages are approximately aligned with said first primary stretch direction;

said second carcass predetermined pattern comprises a pattern of elongate inflatable passages in side-by-side relationship, said widths of said second carcass inflatable passages are misaligned with said second primary stretch direction; and said widths of said second carcass inflatable passages are increased to achieve inflation heights equivalent to inflation heights that would be achieved if said second primary stretch direction were aligned with said widths of said second carcass inflatable passages.

12. The method of claim 10 wherein the de-icer is adapted for attachment to an airfoil having a stagnation line induced by an airstream that impinges upon the leading edge and passes around the airfoil, further comprising the step of abutting said first and second carcasses along said first and second edges about parallel and proximate to the stagnation line.

13. The method of claim 7 wherein said first carcass predetermined pattern comprises a pattern of elongate inflatable passages in side-by-side relationship, each of said first carcass inflatable passages having a width, said widths of said first carcass inflatable passages are approximately aligned with said first primary stretch direction; and, said second carcass predetermined pattern comprises a pattern of elongate inflatable passages in side-by-side relationship, said widths of said second carcass inflatable passages are approximately aligned with said second primary stretch direction.

14. The method of claim 7 wherein said first carcass predetermined pattern comprises a pattern of elongate inflatable passages in side-by-side relationship, each of said first carcass inflatable passages having a width, said widths of said first carcass inflatable passages are approximately aligned with said first primary stretch direction; and, said second carcass predetermined pattern comprises a pattern of elongate inflatable passages in side-by-side relationship, said widths of said second carcass inflatable passages are misaligned with said second primary stretch direction.

15. The method of claim 7 wherein the de-icer is adapted for attachment to an airfoil having a stagnation line induced by an airstream that impinges upon the leading edge and passes around the airfoil, further comprising the step of abutting said first and second carcasses along said first and second edges about parallel and proximate to the stagnation line.

16. The method of claim 15 wherein said first carcass predetermined pattern comprises a pattern of elongate inflatable passages in side by-side relationship, each of said first carcass inflatable passages having a width, said widths of said first carcass inflatable passages are approximately aligned with said first primary stretch direction;

said second carcass predetermined pattern comprises a pattern of elongate inflatable passages in side-by-side relationship, said widths of said second carcass inflatable passages are misaligned with said second primary stretch direction; and said widths of said second carcass inflatable passages are increased to achieve inflation heights equivalent to inflation heights that would be achieved if said second primary stretch direction were aligned with said widths of said second carcass inflatable passages.

17. The method of claim 15 wherein said first carcass predetermined pattern comprises a pattern of elongate inflatable passages in side-by-side relationship, each of said first carcass inflatable passages having a width, said widths of said first carcass inflatable passages are approximately aligned with said first primary stretch direction; and, said second carcass predetermined pattern comprises a pattern of elongate inflatable passages in side-by-side relationship, said widths of said second carcass inflatable passages are approximately aligned with said second primary stretch direction.

18. The method of claim 15 wherein said first carcass predetermined pattern comprises a pattern of elongate inflatable passages in side-by-side relationship, each of said first carcass inflatable passages having a width, said widths of said first carcass inflatable passages are approximately aligned with said first primary stretch direction; and, said second carcass predetermined pattern comprises a pattern of elongate inflatable passages in side-by-side relationship, said widths of said second carcass inflatable passages are misaligned with said second primary stretch direction.

19. The method of claim 12 wherein said first carcass predetermined pattern comprises a pattern of elongate inflatable passages in side-by-side relationship, each of said first carcass inflatable passages having a width, said widths of said first carcass inflatable passages are approximately aligned with said first primary stretch direction;

said second carcass predetermined pattern comprises a pattern of elongate inflatable passages in side-by-side relationship, said widths of said second carcass inflatable passages are misaligned with said second primary stretch direction; and said widths of said second carcass inflatable passages are increased to achieve inflation heights equivalent to inflation heights that would be achieved if said second primary stretch direction were aligned with said widths of said second carcass inflatable passages.

20. The method of claim 12 wherein said first carcass predetermined pattern comprises a pattern of elongate inflatable passages in side-by-side relationship, each of said first carcass inflatable passages having a width, said widths of said first carcass inflatable passages are approximately aligned with said first primary stretch direction; and, said second carcass predetermined pattern comprises a pattern of elongate inflatable passages in side-by-side relationship, said widths of said second carcass inflatable passages are approximately aligned with said second primary stretch direction.

21. The method of claim 12 wherein said first carcass predetermined pattern comprises a pattern of elongate inflatable passages in side-by-side relationship, each of said first carcass inflatable passages having a width, said widths of said first carcass inflatable passages are approximately aligned with said first primary stretch direction; and, said second carcass predetermined pattern comprises a pattern of elongate inflatable passages in side-by-side relationship, said widths of said second carcass inflatable passages are misaligned with said second primary stretch direction.

* * * * *